United States Patent [19]
Linder

[11] 3,747,268
[45] July 24, 1973

[54] SECTIONAL EASYUP PLANTER
[75] Inventor: Marshall Linder, Rockford, Ill.
[73] Assignee: AT & M Corporation, Rockford, Ill.
[22] Filed: Nov. 10, 1971
[21] Appl. No.: 197,381

[52] U.S. Cl............................ 47/34, 47/39, 248/44
[51] Int. Cl................................................ A01g 9/02
[58] Field of Search........................ 47/34, 39, 41.1; 248/44; 119/69

[56] References Cited
UNITED STATES PATENTS

| 1,499,473 | 7/1924 | Price | 47/34 |
| 2,928,633 | 3/1960 | Holmes et al. | 248/44 |
| 3,302,909 | 2/1967 | Glassman | 248/44 |
| 1,117,158 | 11/1914 | Bernartz et al. | 248/44 |
| 1,575,101 | 3/1926 | Edwards | 47/39 X |
| 3,505,760 | 4/1970 | Ambrose | 47/38 |

Primary Examiner—Robert E. Bagwill
Attorney—Andrew F. Wintercorn

[57] ABSTRACT

The two semicircular sections of this planter have registering vertical V-grooves defined at the middle of the abutting flat sides thereof to receive with a wedge fit the opposite sides of a generally cylindrical lamp post or the like on which the planter is to be mounted, permitting a good range of vertical adjustments to suit the taste of the owner. The half sections are identical and molded of plastic material and are tapered so as to nest neatly for compact packaging. To accommodate a variety of shapes, sizes and designs of posts, rubber grommets carried on the middle of opposite sides of each groove, project radially inwardly and can be trimmed down in length to suit different diameters of posts, some of which would otherwise be too small to fit in this planter, and they are compressible and enable clamping the planter on the smallest posts quite securely.

4 Claims, 9 Drawing Figures

PATENTED JUL 24 1973 3,747,268

INVENTOR:
Marshall L. Linder

INVENTOR:
Marshall L. Linder
Attorney

SECTIONAL EASYUP PLANTER

This invention relates to planters of sectional semicircular construction having registering vertical V-grooves defined at the middle of the abutting flat sides thereof adapted to have a wedging fit on the opposite sides of a lamp post or the like when bolts extending through registering holes in the vertical walls on the flat sides are tightened, this construction enabling setting the planter at any selected elevation and easily adjusting it later up or down, as desired, despite the usual taper.

A further feature is the provision of rubber grommets carried on the middle of opposite sides of each groove, projecting radially inwardly, which can be trimmed down in length to suit different diameters of posts that would otherwise be too small to fit in this planter. They are compressible and enable clamping the planter on the smallest posts quite securely.

The invention is illustrated in the accompanying drawings, in which the same reference numerals are applied to corresponding parts:

Figure 1:
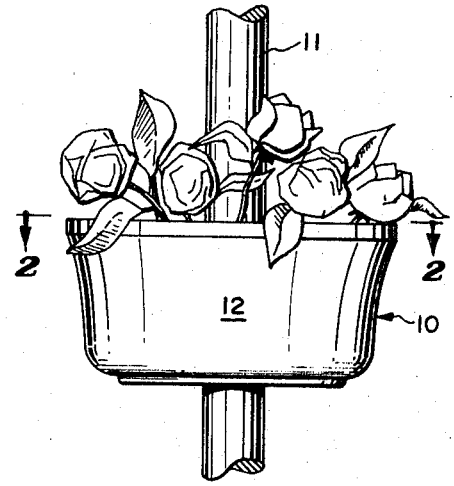
FIG. 1 is a side view of the planter of my invention, mounted on a supporting lamp post.
Figure 2:
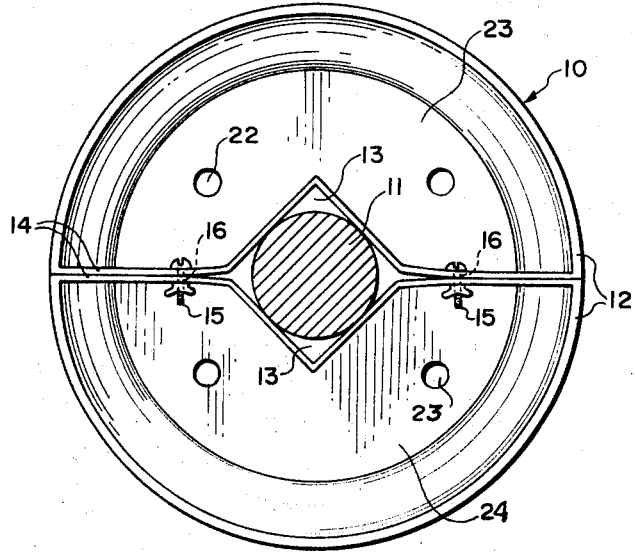
FIG. 2 is a horizontal section on the line 2—2 of FIG. 1, illustrating the wedging action of the flexible resilient V-grooved portions on opposite sides of the post.

Referring to the drawings, the reference numeral 10 designates a planter made in accordance with my invention shown mounted on a light post 11, the two molded plastic semi-circular cupped halves 12 of the planter having registering vertical V-shaped grooves 13 provided in the middle of the vertical walls 14 that define the abutting flat sides of the halves, in which the circular cross-section of the post is wedgingly engaged, as seen in FIG. 2, when the connecting bolts 15 are tightened. These bolts extend through registering holes 16 provided in the walls 14 in laterally spaced relation to the V-shaped portions 13. Obviously, if the planter is originally set too high or too low on a post, the owner can easily remedy that, despite some taper on the post, by loosening the bolts 15 and resetting the planter at the desired elevation before tightening the bolts again.

Figure 5:
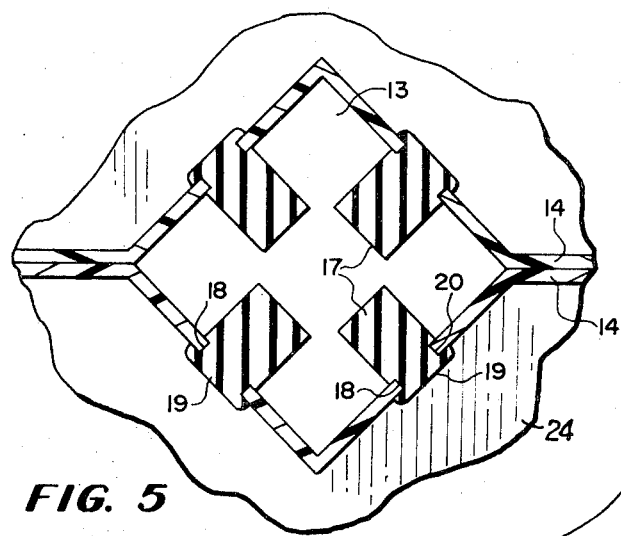
FIG. 5 is an enlarged horizontal section on line 5—5 of FIG. 7.
Figure 6:
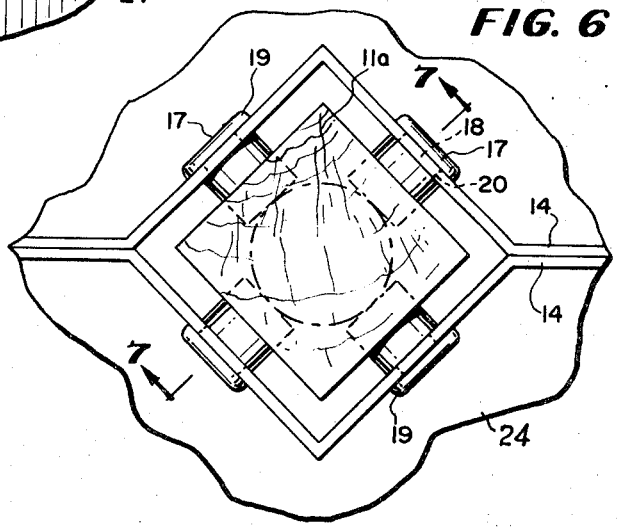
FIG. 6 is a section related to FIG. 5 in full lines showing a square large post and in dotted lines a smaller round post for support, the novel feature being that the rubber grommets will serve to grip the smaller round post without any trimming off of material on the inner ends of the grommets, whereas some trimming is necessary to accommodate the larger square post.
Figure 7:
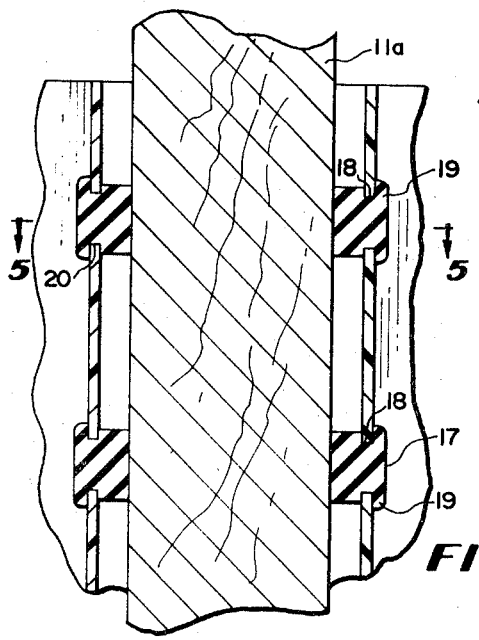
FIG. 7 is a vertical section on line 7—7 of FIG. 6, showing that two vertically spaced sets of grommets maintain good parallelism between the planter and post.

While most lamp posts are of a standard size, an owner of one of these planters may find it desirable to mount it on a smaller size post or standard of some kind, in which event the provision of molded cylindrical elongated rubber or plastic grommets 17 projecting radially inwardly from the centers of the flat inner sides of the V-grooves 13 will be highly beneficial, these being compressible and resilient to provide a good grip when the bolts 15 are tightened. The grommets have reduced necks 18 and retaining heads 19 and the latter are small enough to permit their being forced through the holes 20 to fasten the grommets in place, and, if the grommets are too long to suit the needs of a given job, their inner ends can easily be trimmed off to whatever extent may be necessary, as shown in full lines in FIGS. 5 and 6 where a large square post 11a is shown as the support.

Figure 8:
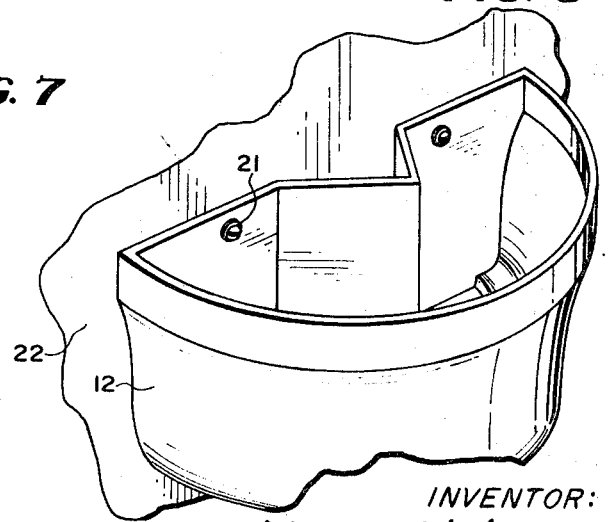
FIG. 8 shows in perspective how one half of the planter may be used separately for mounting on the wall of a garage or house, for example.
Figure 9:
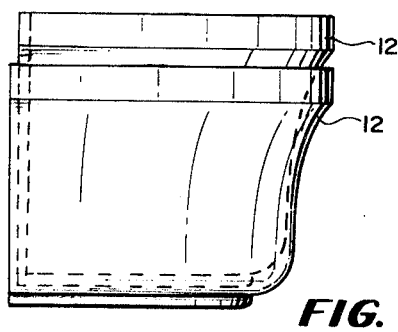
FIG. 9 is a side view of two nested planter parts showing how the nesting makes for easy compact packaging of these planters.

Although these planters are usually mounted on posts, they often are used to decorate an otherwise blank and unattractive wall on a garage, for example, as shown in FIG. 8. There a half 12 is shown fastened by screws 21 or the like to the wall 22.

Figure 4:
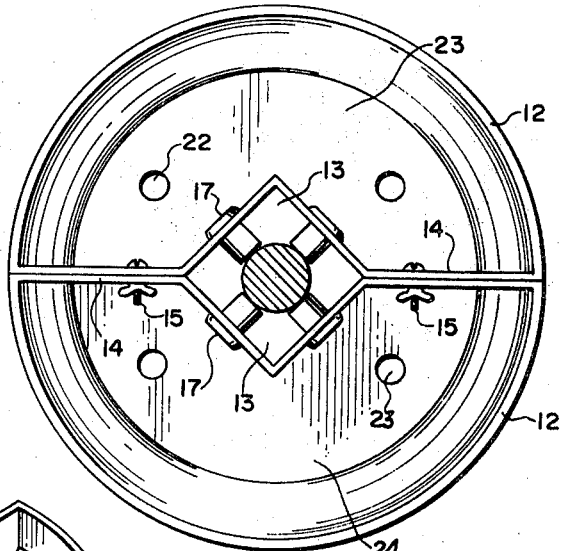
FIG. 4 is a horizontal section showing how the modified construction of FIG. 3 permits application to smaller posts.
Figure 3:
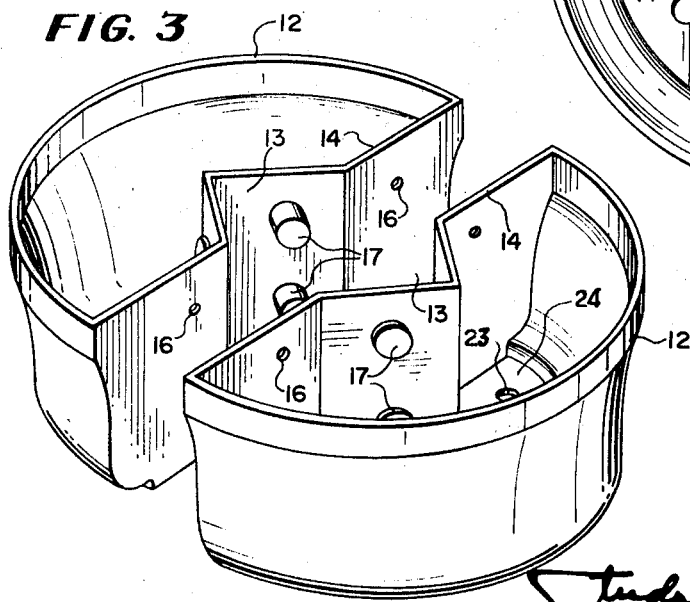
FIG. 3 is a perspective view of the planter parts showing a modification with radially disposed flexible resilient grommets, designed to increase the range of sizes and shapes of supports on which the planter can be mounted.

In conclusion, the halves 12 are molded of plastic material having the required flexibility and resilience. The taper of the halves is of necessity for removal from the mold, and is of advantage in the nesting of the halves for convenience and compactness in packaging. In molding the halves, drain holes 23 are formed in the bottom walls 24, as shown in FIGS. 2, 3 and 4.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A planter for application to upright posts comprising two substantially semi-circular half-sections, each of identical one-piece molded plastic construction, the sections being assembled so that there are facing vertical inner side walls that have vertical V-shaped grooves defined by V-shaped portions in registering opposed relationship at the middle to accommodate the supporting post therebetween with wedging engagement in each V-groove when the half-sections are secured together, the facing vertical side walls and the V-shaped portions thereof being flexible and resilient, and bolts extending horizontally through registering openings provided in said inner side walls serving to draw the two half-sections together, whereby to permit forcing the inner side walls into face-to-face abutment partway inwardly from the outer diameter of the two sections even though the V-shaped portions receiving the supporting post therebetween are spread apart by the post clamped resiliently therebetween.

2. A planter as set forth in claim 1 wherein, in order to permit application to a supporting post of smaller diameter that won't have wedging engagement in the V-grooves, each V-groove has radially inwardly projecting resilient compressible members carried thereon, which, when the bolts are tightened to draw the half-sections toward each other, are compressed endwise against the smaller post from opposite sides to clamp the planter to said post.

3. A planter as set forth in claim 2, wherein said compressible members are elongated headed grommets secured at their outer ends to the inner sides of the V-grooves and adapted to be trimmed off at their inner ends to whatever extent may be necessary to suit the size of the post on which the planter is to be mounted.

* * * * *